United States Patent

[11] 3,633,402

| [72] | Inventors | James R. Miller, III<br>7812 Charlotte Drive, Huntsville, Ala. 35802;<br>Robert W. Peterson, 772 Quince Orchard Blvd. Apt. 201, Gaithersburg, Md. 20760 |
|---|---|---|
| [21] | Appl. No. | 68,269 |
| [22] | Filed | Aug. 31, 1970 |
| [45] | Patented | Jan. 11, 1972 |

[54] DEADWEIGHT TESTER WEIGHTS
1 Claim, 5 Drawing Figs.

[52] U.S. Cl. .................................................. 73/4 D, 73/419
[51] Int. Cl. ............................................ G01l 27/00, G01l 7/16
[50] Field of Search .......................................... 73/4 D, 4 R, 419

[56] References Cited
UNITED STATES PATENTS
3,464,256  9/1969  Lloyd ........................... 73/4 D FOREIGN PATENTS
691,124  7/1930  France ........................ 73/4 D

*Primary Examiner*—Louis R. Prince
*Assistant Examiner*—William A. Henry, II
*Attorneys*—Harry M. Saragovitz, Edward J. Kelly, Herbert Berl and Charles R. Carter ABSTRACT: A weight set for applying a deadweight in the fluid-supported piston of a pressure test set to produce a proportionate pressure in the supporting fluid. The weight includes a circular baseplate disposed for rotation around the cylinder of the test set and provided with an axial rod for engaging the piston. The weight set is spun around the piston to overcome static friction and provide a steady pressure in the fluid. A number of hollow cylinder weights are secured to the plate to provide a high moment of inertia per mass and achieve an appreciable spin time for accurate reading of the fluid pressure.

PATENTED JAN 11 1972

James R. Miller, III
Robert W. Peterson,
INVENTORS.

BY Harry H. Saragovitz
Edward J. Kelly
Herbert Berl
Charles R. Carter

3,633,402

DEADWEIGHT TESTER WEIGHTS

BACKGROUND OF THE INVENTION

This invention relates to the field of pressure measurement. A problem was presented in obtaining accurate measurements from existing test sets in the low-pressure ranges of 5-25 p.s.i. The weights are rotated by hand to overcome static friction and secure a steady pressure in the fluid. The weights of previous design were right cylinders enclosing a pressure cylinder and had a spin time of approximately 10 seconds which was insufficient to achieve a steady pressure reading in the fluid.

SUMMARY OF THE INVENTION

The present invention has provided a solution to this problem by increasing the moment of inertia of the weight set per unit of mass to increase the spin time approximately 6 to 10 times. The spin time of the weights is in direct relation to the moment of inertia thereof.

This invention may be better understood from the following detailed description taken in conjunction with the accompanying drawing.

DESCRIPTION OF THE PREFERRED EMBODIMENT

Figure 1:
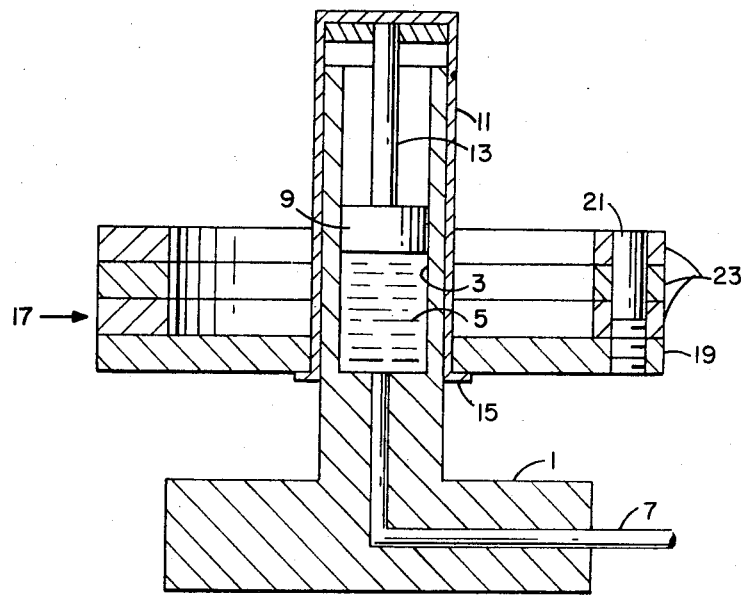
FIG. 1 shows a side view of the weight set suspended on a piston.
Figure 2:
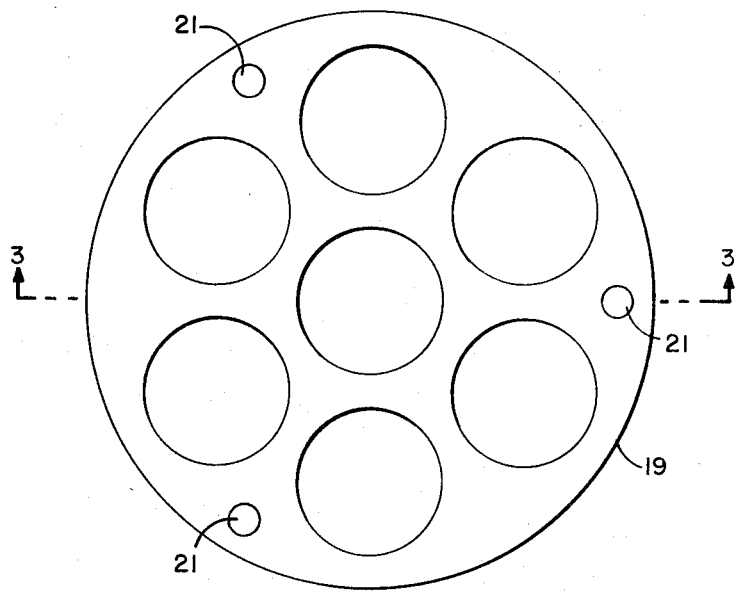
FIG. 2 is a plane view of the baseplate.
Figure 3:
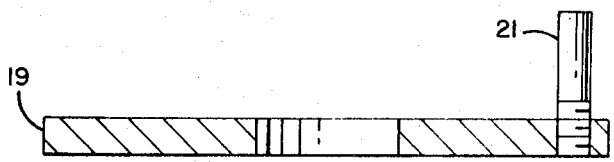
FIG. 3 is a section view taken along line 3—3 of FIG. 2.
Figure 4:
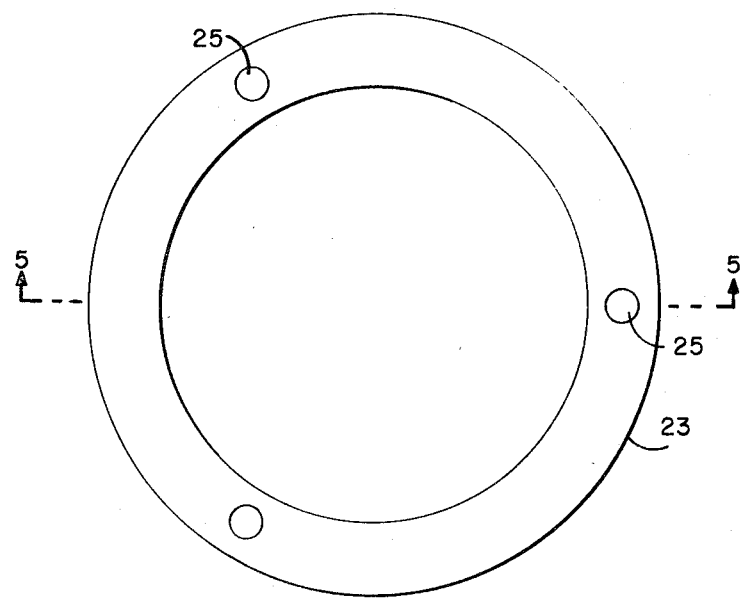
FIG. 4 is a plane view of the hollow cylindrical weight.
Figure 5:
FIG. 5 is a section view taken along line 5—5 of FIG. 4.

Reference numeral 1 indicates a test set including a chamber 3 that houses a fluid medium such as gas or oil 5 connected to tube 7 for supporting a piston 9. A mounting member 11 enclosing chamber 3 is provided with a rod 13 for engaging piston 9 and a rim 15 supporting a weight set generally indicated as 17. A baseplate 19 of set 17 includes spaced aligning pins 21. Weights 23 are provided with a plurality of openings 25 for engaging pins 21 and the weights are hollow cylinders to impart to weight set 17 a moment of inertia 6 to 10 times greater than the moment of inertia of a solid cylindrical weight supported by rim 15 to provide an adequate time period for taking readings of steady state pressure in the supporting fluid 5.

We claim:
1. A weight set for applying a deadweight upon a piston of a test set to produce a proportionate pressure in a fluid that supports the piston comprising:
   a. A circular baseplate disposed for rotation around a cylinder of a test set including a plurality of aligning pins spaced thereon, a plurality of weights provided with openings for engagement with said pins;
   b. said weights having hollow cylindrical configuration to provide to the weights set a greater moment of inertia than that provided by a right cylindrical weight of equal mass and smaller diameter.

* * * * *